United States Patent
Nagasaka et al.

(10) Patent No.: US 6,176,619 B1
(45) Date of Patent: Jan. 23, 2001

(54) WATER LUBRICATED MACHINE COMPONENT HAVING CONTACTING SLIDING SURFACES

(75) Inventors: Hiroshi Nagasaka; Yoshikazu Kimura; Kenichi Sugiyama; Momoko Kakutani, all of Kanagawa-ken (JP)

(73) Assignee: Ebara Corporation, Tokyo (JP)

(*) Notice: Under 35 U.S.C. 154(b), the term of this patent shall be extended for 0 days.

(21) Appl. No.: 09/339,189

(22) Filed: Jun. 24, 1999

Related U.S. Application Data

(62) Division of application No. 08/802,262, filed on Feb. 19, 1997, now Pat. No. 5,961,218.

(30) Foreign Application Priority Data

Feb. 20, 1996 (JP) .......................................... 8-58323
Nov. 7, 1996 (JP) .................................................. 8-313034

(51) Int. Cl.[7] .............................. F16C 32/06; F16C 33/10
(52) U.S. Cl. ........................ 384/123; 384/292; 384/912
(58) Field of Search .................................... 384/123, 125, 384/291, 292, 322, 368, 625, 912, 913

(56) References Cited

U.S. PATENT DOCUMENTS

| | | | |
|---|---|---|---|
| 4,582,368 | 4/1986 | Fujita et al. | 384/625 |
| 4,848,934 | 7/1989 | Blakely et al. | 384/625 |
| 5,173,797 | 12/1992 | Zedekar et al. | 384/123 |
| 5,222,521 | 6/1993 | Kihlberg | 137/625.69 |
| 5,322,735 | 6/1994 | Fridet et al. | 384/625 |
| 5,381,456 | 1/1995 | Vetter et al. | 384/123 |
| 5,387,461 | 2/1995 | Kamiya et al. | 384/625 |
| 5,427,456 | 6/1995 | Hensel | 384/292 |
| 5,448,121 | 9/1995 | Tada | 384/292 |
| 5,518,820 | 5/1996 | Averbach et al. | 384/912 |
| 5,593,234 | 1/1997 | Liston | 384/912 |
| 5,660,482 | 8/1997 | Newley et al. | 394/913 |
| 5,700,546 | 12/1997 | Fujita et al. | |

FOREIGN PATENT DOCUMENTS

| | | |
|---|---|---|
| 34 35 821 A1 | 5/1985 | (DE) . |
| 37 33 117 A1 | 4/1988 | (DE) . |
| 195 08 085 A1 | 10/1995 | (DE) . |
| 0105860 | 4/1984 | (EP) . |
| 0286024 B1 | 10/1988 | (EP) . |
| 0454616 A1 | 10/1991 | (EP) . |
| 0685439 A2 | 12/1995 | (EP) . |
| 0685439 * | 12/1995 | (EP) . |
| 05052222 | 3/1993 | (JP) . |

OTHER PUBLICATIONS

European Search Report for European application No. EP 97 10 2688, dated Jul. 29, 1997.

Nuclear Instruments and Method in Physics Research B80/81(1993) "The properties of titanium nitride prepared by dynamic ion mixing." p. 1380–1383.

Nuclear Instruments and Method in Physics Research B121(1997) "Tribological properties of titanium nitride films prepared by dynamic ion beam mixing method." p. 279–282.

* cited by examiner

*Primary Examiner*—Vinh T. Luong
*Assistant Examiner*—Matthew A. Kaness
(74) *Attorney, Agent, or Firm*—Armstrong, Westerman, Hattori, McLeland & Naughton

(57) ABSTRACT

A water lubricated bearing or water lubricated seal using water as a lubricant. The bearing or seal has: a rotary member secured directly or indirectly to a rotary side, and a stationary member secured directly or indirectly to a stationary side and facing the rotary member for making sliding contact therewith. A substrate of either one of the rotary member and the stationary member is a metallic material and a thin titanium nitride film is formed on the sliding surface thereof. The other member is made of a non-brittle material or a film of hard material is formed on the sliding surface thereof. Thereby, a coefficient of friction of the bearing or seal is reduced and a wear resistance of the same is improved.

9 Claims, 8 Drawing Sheets

RESULTS OF CAVITATION-EROSION TEST

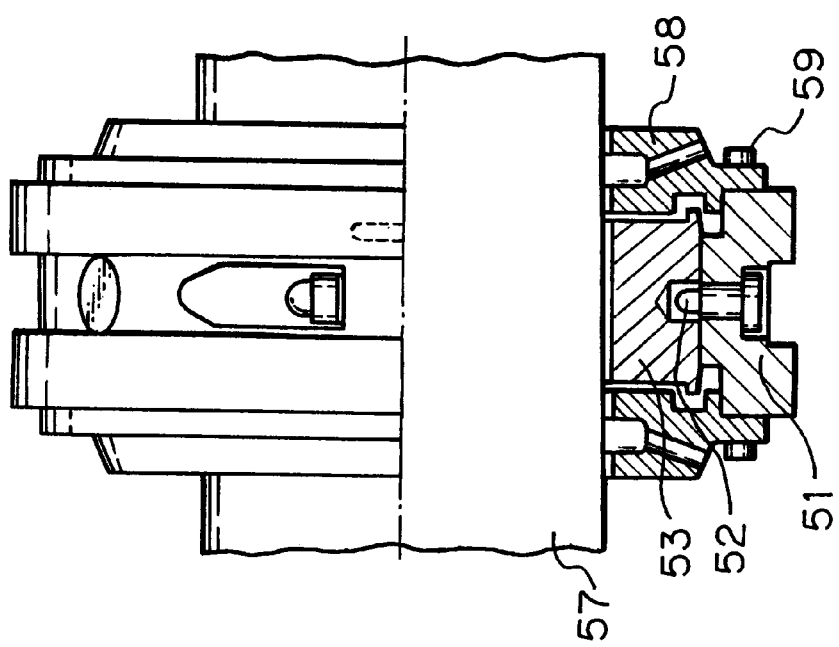
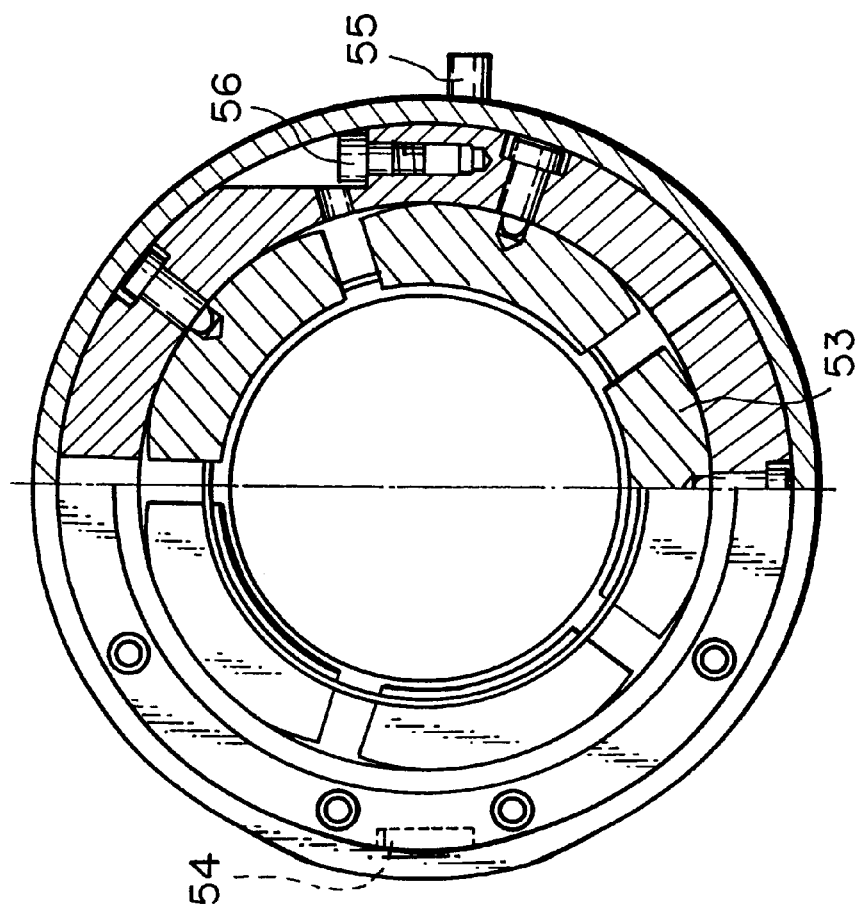

WATER LUBRICATED MACHINE COMPONENT HAVING CONTACTING SLIDING SURFACES

This application is a division of prior application Ser. No. 08/802,262 filed Feb. 19, 1997, now U.S. Pat. No. 5,961,218 (Oct. 5, 1999).

BACKGROUND OF THE INVENTION

1. Field of the Art

The present invention relates to a water lubricated bearing or water lubricated seal which has high wear resistance and a low coefficient of friction, and more particularly to a water lubricated bearing or water lubricated seal which is suitable for use in fluid machinery, e.g., pumps, turbines, compressors, etc.

2. Prior Art

Many conventional water lubricated bearings or water lubricated seals which have heretofore been used for fluid machinery, e.g., pumps, turbines, compressors, etc., have an arrangement comprising a combination of a movable member which employs a ceramic material such as SiC as a substrate, and a stationary member which employs a hard metal such as tungsten carbide (WC) as a substrate.

With the need for fluid machinery to be reduced in size, operate at higher speed and increase in capacity, service conditions under which seals and bearings are used have become increasingly adverse in recent years. That is, seals and bearings are now used under high-speed and heavy-load conditions. Accordingly, it has been pointed out that a material such as a hard metal which has heretofore been used for seals and bearings gives rise to problems such as fracturing under thermal shock and thermal fatigue cracking, caused by repeated application of friction heat generated by sliding contact between solids.

On the other hand, ceramic materials, e.g., SiC, are superior to hard metals in resistance to thermal stress caused by sliding. However, when used as a material for a high-speed rotating member, a ceramic material is inferior in mechanical strength and lacks resistance to shock. Further, when a metallic material is used as a sliding member, the surface of the metallic material may be subjected to carburizing, nitrating or other similar hardening treatment. With these surface treatments, however, a satisfactory sliding surface cannot be obtained in terms of the hardness of the modified layer itself and the deformation of the substrate after the treatment.

In addition, in a conventional water lubricated bearing or water lubricated seal adopting a titanium nitride film coated on a substrate of a metallic material, since an appropriate material for mating with the titanium nitride film has not been provided, sufficient sliding characteristics in water could not been obtained.

SUMMARY OF THE INVENTION

In view of the above-described circumstances, an object of the present invention is to provide a water lubricated bearing or water lubricated seal which has a reduced coefficient of friction, and which provides improved wear resistance.

Another object of the present invention is to provide a water lubricated bearing or water lubricated seal which has excellent anti-heat shock and anti-mechanical shock properties.

To solve the above-described problems, according to a first aspect of the present invention, a water lubricated bearing or water lubricated seal using water as a lubricant comprises: a rotary member secured directly or indirectly to a rotary side, and a stationary member secured directly or indirectly to a stationary side and facing the rotary member for making sliding contact therewith; wherein a substrate of either one of the rotary member and the stationary member is a metallic material and a thin titanium nitride film is formed on sliding surface thereof, and wherein the other member is made of a non-brittle material or a film of hard material is formed on the sliding surface thereof.

The non-brittle material may be a metallic material, and the film of hard material may be a ceramic film.

The ceramic film may be a nitride ceramic film such as a chromium nitride film, a boron nitride film, a titanium nitride film, or a film made of a material consisting essentially of an iron nitride, an oxide ceramic film such as a film made of a material consisting essentially of a chromium oxide, an aluminium oxide, a titanium oxide, a zirconium oxide, or a composite oxide of an aluminium oxide and a chromium oxide, or a carbide ceramic film such as a diamond-like carbon film, or a film made of a material consisting essentially of a tungsten carbide or a chromium carbide.

In a water lubricated bearing or water lubricated seal described above, the ceramic film may be formed by chemical vapor deposition, physical vapor deposition, spraying, wet plating or hot dipping.

The physical vapor deposition may be effected by a film forming method using an ion beam such as sputtering, ion plating, ion implantation, a joint method of ion implantation and vacuum evaporation, or the like.

According to a second aspect of the present invention, in a water lubricated bearing or water lubricated seal according to the first aspect, the non-brittle material is a metallic material, and the film of hard material is a hard chromium plating formed on the sliding surface of the other member.

According to a third aspect of the present invention, in a water lubricated bearing or water lubricated seal according to the first aspect: at least the sliding surface of the other member is made of a martensitic stainless steel.

According to a fourth aspect of the present invention, in a water lubricated bearing or water lubricated seal according to the first aspect: at least the sliding surface of the other member is made of a polyether ether ketone including a carbon fiber or a polytetrafluoroethylen resin including a carbon fiber.

According to a fifth aspect of the present invention, a water lubricated bearing or water lubricated seal using water as a lubricant comprises: a rotary member secured directly or indirectly to a rotary side, and a stationary member secured directly or indirectly to a stationary side and facing the rotary member for making sliding contact therewith; wherein a substrate of either one of the rotary member and the stationary member is a metallic material and a thin titanium nitride film is formed on the sliding surface thereof, wherein at least the sliding surface of the other member is made of a hard carbon.

According to the arrangement of the present invention described above, since the substrate of the rotary member and the stationary member or the rotary member and the stationary member themselves are made of a non-brittle material, they can provide excellent anti-heat shock and anti-mechanical shock properties. In addition, since the sliding surface of the rotary member and or the stationary member is formed with a film of hard material, it can provide a low coefficient of friction and improved wear resistance.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIG. 5 shows one arrangement of a water lubricated dynamic pressure journal bearing, wherein FIG. 5(a) is a front view, and FIG. 5(b) is a side view, with a portion in section, FIG. 6 shows one arrangement of a water lubricated static pressure journal bearing, wherein

FIG. 7 shows one arrangement of a water lubricated dynamic pressure thrust bearing, wherein

FIG. 8 shows one arrangement of a water lubricated static pressure thrust bearing, wherein

PREFERRED EMBODIMENTS

Figure 1:
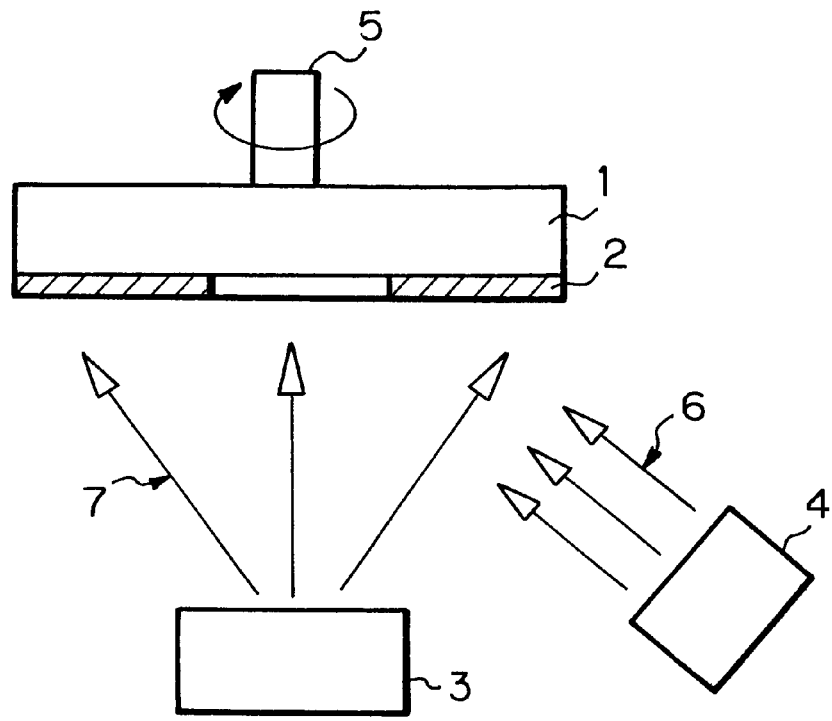
FIG. 1 is a conceptual view showing the arrangement for forming a thin titanium nitride film on a substrate by a dynamic ion mixing method.

Preferred embodiments of the present invention will now be described. The water lubricated bearing or water lubricated seal of the invention is composed of a rotary member secured directly or indirectly to a rotary side and a stationary member secured directly or indirectly to a stationary side and facing the rotary member for making sliding contact therewith. In the embodiments of the present invention, the water lubricated bearings or water lubricated seals were composed of the rotary members and the stationary members with a combination of the materials shown in Table 1. Table 2 shows frictional wear test results using a combination of the materials shown in Table 1 under the test conditions shown in Table 3.

TABLE 1

| | Rotary side member | | | Stationary side member | | | |
|---|---|---|---|---|---|---|---|
| | Substrate | Sliding Surface | Film thickness ($\mu$m) | Substrate | Sliding surface | Film thickness ($\mu$m) | Vickers Hardness HV |
| Comparative Example 1 | SUS420J2 | | | SUS420J2 | | | 400–500 |
| Comparative Example 2 | SUS630 | | | SUS630 | | | " |
| Example 1 | * | TiN | 3 | SUS420J2 | | | 400–500 |
| Example 2 | * | TiN | 3 | SUS630 | | | " |
| Example 3 | * | TiN | 3 | * | CrN | 4 | 1500 or more |
| Example 4 | * | TiN | 3 | * | DLC | 1 | 2500 |
| Example 5 | * | TiN | 3 | * | BN | 1 | 2000 |
| Example 6 | * | TiN | 3 | * | Hard Cr plating | 100–150 | 600–800 |
| Example 7 | * | TiN | 3 | *** | Nitride | 50 | 800–1000 |
| Example 8 | * | TiN | 3 | ** | W$_2$C + Ti*1 | 1000 | 800–1200 |
| Example 9 | * | TiN | 3 | * | WC + Ni + P*2 | 400 | " |
| Example 10 | * | TiN | 10 | ** | W$_2$C + Ti*1 | 1000 | " |
| Example 11 | * | TiN | 10 | * | WC + Ni + P*2 | 400 | " |
| Example 12 | * | TiN | 10 | * | WC + NiCr*3 | 100 | " |
| Example 13 | * | TiN | 10 | * | Cr$_3$C$_2$ + NiCr*4 | 200 | " |
| Example 14 | * | TiN | 3 | * | Al$_2$O$_3$ | 200 | " |
| Example 15 | * | TiN | 3 | * | Al$_2$O$_3$ + 2.5 TiO$_2$ + 2 SiO$_2$ | 200 | " |
| Example 16 | * | TiN | 3 | * | ZrO$_2$ + 5 CaO + 4 SiO$_2$ | 200 | " |
| Example 17 | * | TiN | 3 | * | Cr$_2$O$_3$ | 200 | " |
| Example 18 | * | TiN | 3 | * | TiN | 200 | 2500 or more |
| Example 19 | * | TiN | 3 | Hard carbon | | | 800–1200 |
| Example 20 | * | TiN | 3 | PTFE + CF | | | |
| Example 21 | * | TiN | 3 | PEEK + CF | | | |

*: SUS316L
**: SUS304
***: SUS630
****: SUS410
*1: plasma transferred arc spraying build up method (PTA)
*2: plasma spraying method (PS)
*3: plasma jet spraying method (PJS)
*4: vacuum plasma spraying method (VPS)

TABLE 2

|  | Seizure surface pressure (Mpa) | Coefficient of friction | Observed result of the sliding surface after the test | |
|---|---|---|---|---|
|  |  |  | Damage at rotary side | Damage at Stationary side |
| Comparative Example 1 | 0.1 |  | Pronounced | Pronounced |
| Comparative Example 2 | 0.1 |  | Pronounced | Pronounced |
| Example 1 | 0.4 | 0.2 | Slight | Slight |
| Example 2 | 0.4 | 0.2 | Slight | Slight |
| Example 3 | 0.6 | 0.1 | None | None |
| Example 4 | 0.8 | 0.1 | None | None |
| Example 5 | 0.7 | 0.1 | None | None |
| Example 6 | 0.4 | 0.1–0.3 | None | None |
| Example 7 | 0.3 | 0.1 | None | None |
| Example 8 | 0.1 |  | Slight | Slight |
| Example 9 | 0.1 |  | Slight | Slight |
| Example 10 | 0.2 | 0.3 | Slight | Slight |
| Example 11 | 0.3 | 0.1 | Slight | Slight |
| Example 12 | 0.2 | 0.2 | Slight | Slight |
| Example 13 | 0.3 | 0.2 | Slight | Slight |
| Example 14 | 0.4 | 0.1 | Slight | Slight |
| Example 15 | 0.3 | 0.1 | Slight | Slight |
| Example 16 | 0.2 | 0.2 | Slight | Slight |
| Example 17 | 0.4 | 0.1 | Slight | Slight |
| Example 18 | 0.2 | 0.2 | Slight | Slight |
| Example 19 | 1.0 or more | 0.1 | None | Slight |
| Example 20 | 1.0 or more | 0.1 | None | Slight |
| Example 21 | 1.0 or more | 0.2 | Slight | Slight |

In Examples 1 to 7 shown in Table 1, the stainless steel (SUS316L) was used for a substrate of each rotary member, and thin TiN film of 3 $\mu$m in thickness was formed on a sliding surface thereof. The stainless steel (SUS316L, SUS420J2 or SUS630) was used for a substrate of the stationary member in Examples 3 to 7, and a non-processed sliding surface thereof made of the SUS420J2 steel and SUS630 steel were used in Examples 1 and 2, respectively. A thin CrN film of 4 $\mu$m in thickness was formed on the sliding surface in Example 3. A thin DLC (diamond-like carbon) film of 1 $\mu$m in thickness was formed in Example 4. A thin BN film of 1 $\mu$m in thickness was formed in Example 5. A hard Cr plating of 100 to 150 $\mu$m in thickness was formed in Example 6. A thin nitride film of 50 $\mu$m in thickness was used in Example 7.

In Examples 8 and 9, the SUS316L was used for the substrate of the rotary member, and the thin TiN film of 3 $\mu$m in thickness was formed on the sliding surface thereof. In Example 8, the SUS304 was used for the substrate of the stationary member, and a thin $W_2C$+Ti film of 1000 $\mu$m in thickness was formed on the sliding surface thereof by a plasma transferred arc spraying build up method (PTA). In Example 9, the SUS316L was used for the substrate of the stationary member, and a WC+Ni+P film of 400 $\mu$m in thickness was formed by a plasma spraying method.

In Examples 10 to 13, the SUS316L was used for the substrate of the rotary member, and the thin TiN film of 10 $\mu$m in thickness was formed on the sliding surface thereof. In Example 10, the SUS304 was used for the substrate of the stationary member, and the $W_2C$+Ti film of 1000 $\mu$m in thickness was formed on the sliding surface thereof by a plasma transferred arc spraying build up method(PTA). In Example 11, the SUS316L was used for the substrate of the stationary member, and the WC+Ni+P film of 400 $\mu$m in thickness was formed on the sliding surface thereof by the plasma spraying method. In Example 12, the SUS316L was used for the substrate of the stationary member, and a WC+NiCr film of 100 $\mu$m in thickness was formed on the sliding surface thereof by a plasma jet spraying method. In Example 13, the SUS316L was used for the substrate of the stationary member, and a $Cr_3C_2$+NiCr film of 200 $\mu$m in thickness was formed on the sliding surface thereof by a vacuum plasma spraying method.

In Examples 14 to 18, the SUS316L was used for the substrate of the rotary member, and the thin TiN film of 3 $\mu$m in thickness was formed on the sliding surface thereof. In Example 14, the SUS316L was used for the substrate of the stationary member, and the $Al_2O$ film of 200 $\mu$m in thickness was formed on the sliding surface thereof by a plasma spraying method. In Example 15, the SUS316L was used for the substrate of the stationary member, and $Al_2O_3$+2.5$TiO_2$+2$SiO_2$ film of 200 $\mu$m in thickness was formed on the sliding surface thereof by a plasma spraying method. In Example 16, the SUS316L was used for the substrate of the stationary member, and the $ZrO_3$+5CaO+0.4$SiO_2$ film of 200 $\mu$m in thickness was formed on the sliding surface thereof by a plasma spraying method. In Example 17, the SUS316L was used for the substrate of the stationary member, and the $Cr_2O_3$ film of 200 $\mu$m in thickness was formed on the sliding surface thereof by a plasma spraying method. In Example 18, the SUS316L was used for the substrate of the stationary member, and the TiN film of 200 $\mu$m in thickness was formed on the sliding surface thereof by a plasma spraying method.

In Examples 19 to 21, the SUS316L was used on the substrate of the rotary member, and the thin TiN film of 3$\mu$m in thickness was formed on the sliding surface thereof. A hard carbon was used for the material of the stationary member in Example 19, the PTFE (polytetrafluoroethylen) resin including a carbon fiber was used for the material of the stationary member in Example 20, and PEEK (polyethyl ethyl ketone) including a carbon fiber was used for the material of the stationary member in Example 21.

TABLE 3

| Conditions for a Frictional Wear Test | |
|---|---|
| Surface pressure | 0.1 MPa or more (step up per 0.1 MPa) |
| Peripheral speed | 0.5 m/s |
| Traveling distance | 1000 m (for each surface pressure) |
| Test temperature | Room temperature |
| Lubricant | Distilled water |

Figure 2:
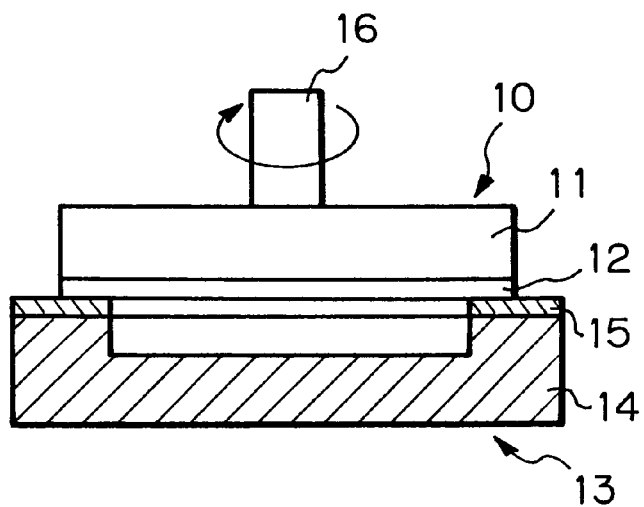
FIG. 2 is a view showing a schematic arrangement of a frictional wear testing machine.

A surface pressure is a pressure that is applied between the sliding surface of a rotary member 10 and the sliding surface of a stationary member 13 in FIG. 2, a peripheral speed represents a sliding speed of the rotary member 10, a traveling distance represents a sliding distance between the rotary member 10 and the stationary member 13.

FIG. 2 shows a schematic arrangement of a frictional wear testing machine. The frictional wear test was conducted by securing the rotary member 10 formed with a thin TiN film 12 on a sliding surface of a substrate 11 to a distal end of a rotating shaft 16, by disposing the stationary member 13 formed with or not formed with a thin film 15 on a sliding surface of a substrate 14 so as to contact the rotary member 10, and by rotating the rotating shaft 16 while applying a predetermined pressure (load) thereto. Starting at 0.1 MPa of a surface pressure, the pressure was increased in increments of 0.1 MPa until a torque is rapidly increased or a torque fluctuation is acute, which point was defined as a critical surface pressure or seizure surface pressure.

As apparent from Table 2, seizure surface pressures of Examples 1 to 7 were higher than those of Comparative Examples of the prior art, no damage was observed to either of the sliding surfaces of the rotary members or the stationary members below the seizure surface pressures thereof in Examples 3 to 7, and only a slight amount of damage was observed on the sliding surface of the rotary member and the stationary member in Examples 1 and 2. Examples 1 to 7 showed excellent results compared with Comparative Examples 1 to 3. In Examples 8 to 13, the seizure surface pressures were equal to or higher than those of Comparative Examples, and only a slight amount of damage was observed on the sliding surfaces of the rotary member and the stationary member. In Examples 14 to 21, the seizure surface pressure was higher than those of Comparative Examples, and only a slight amount of damage or no damage was observed on the sliding surfaces of the rotary side member and the stationary side member.

Specific values of the film thickness shown in Table 1 are just examples and are not limited thereto. For example, in Examples 1 to 5 shown in Table 1, a film thickness of the titanium nitride (TiN) on the sliding surface of the rotary member is 3 $\mu$m, a film thickness of the DLC and BN on the sliding surface of the stationary side member is 1 $\mu$m, and a film thickness of the CrN was 4 $\mu$m. However, the film thickness of these films may be some $\mu$m to some hundreds $\mu$m.

For forming the thin TiN film on the sliding surface of the rotary member or the stationary member mentioned above, so called a dynamic ion mixing method described below was used. FIG. 1 is a conceptual view for forming the TiN film by the dynamic ion mixing method. As shown in FIG. 1, the thin TiN film was formed on a surface of a substrate 2 by securing the substrate 2 on a copper holder 1 which is in turn secured at a distal end of a rotating shaft 5 and water-cooled, disposing an evaporation source 3 and an ion source 4 facing the substrate 2, emitting titanium vapor 7 from the evaporation source 3 toward the substrate 2, and irradiating the substrate 2 with a nitrogen ion beam 6 consisting essentially of nitrogen ions emitted from the ion source 4. It is confirmed experimentally that the thin TiN film formed by the dynamic ion mixing method has stronger adhesion force to the substrate 2 and a remarkably smaller specific wear rate compared with that formed by other methods.

Also, when a titanium nitride film is formed by a dynamic ion mixing method, since a surface roughness does not appreciably change under film formation and there is no substantial deformation of a substrate by such film formation, it is not necessary to effect machining or lapping the surface after film formation.

Figure 3:
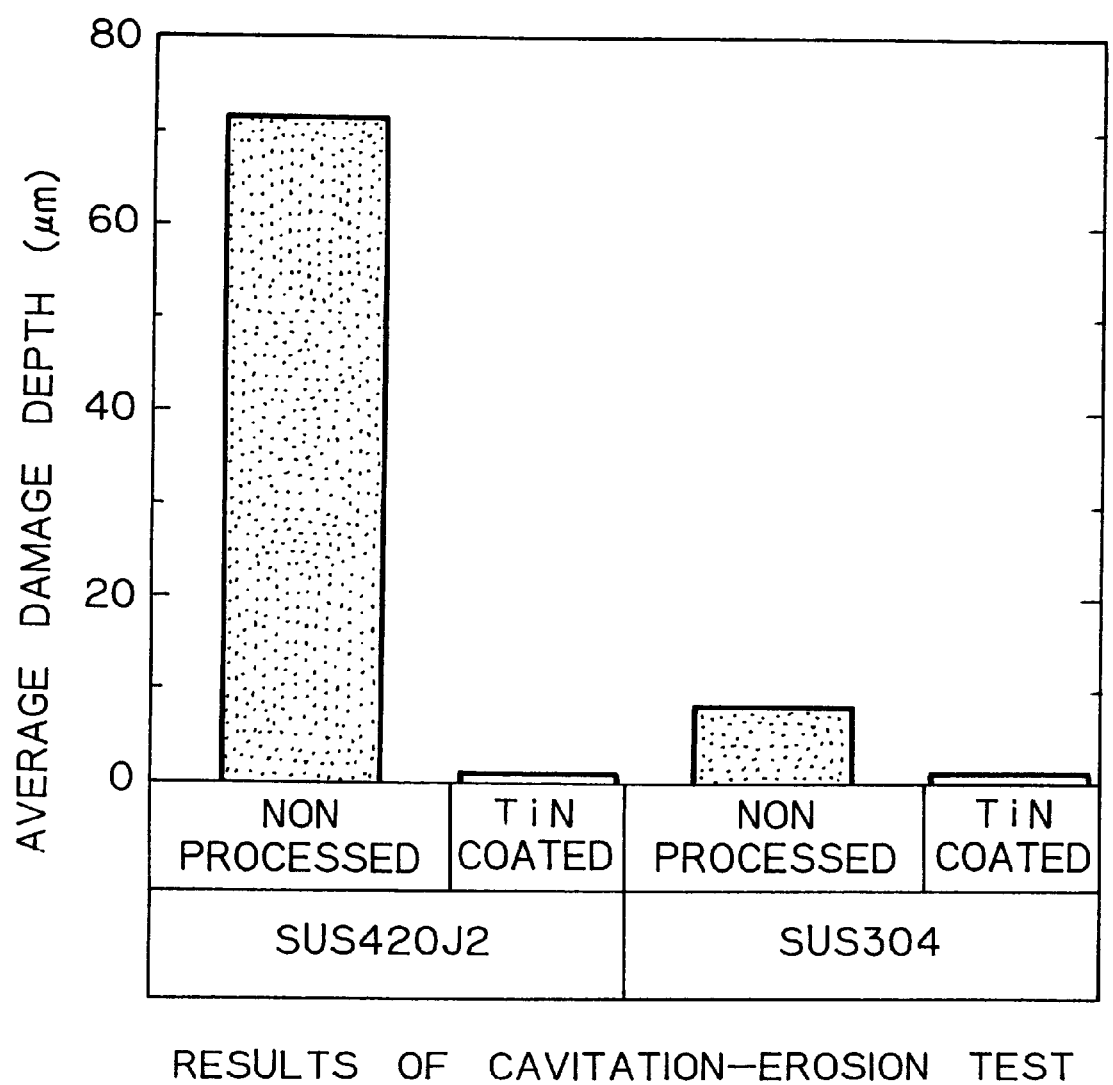
FIG. 3 shows the results of comparison as to the cavitation-erosion test.
Figure 4:
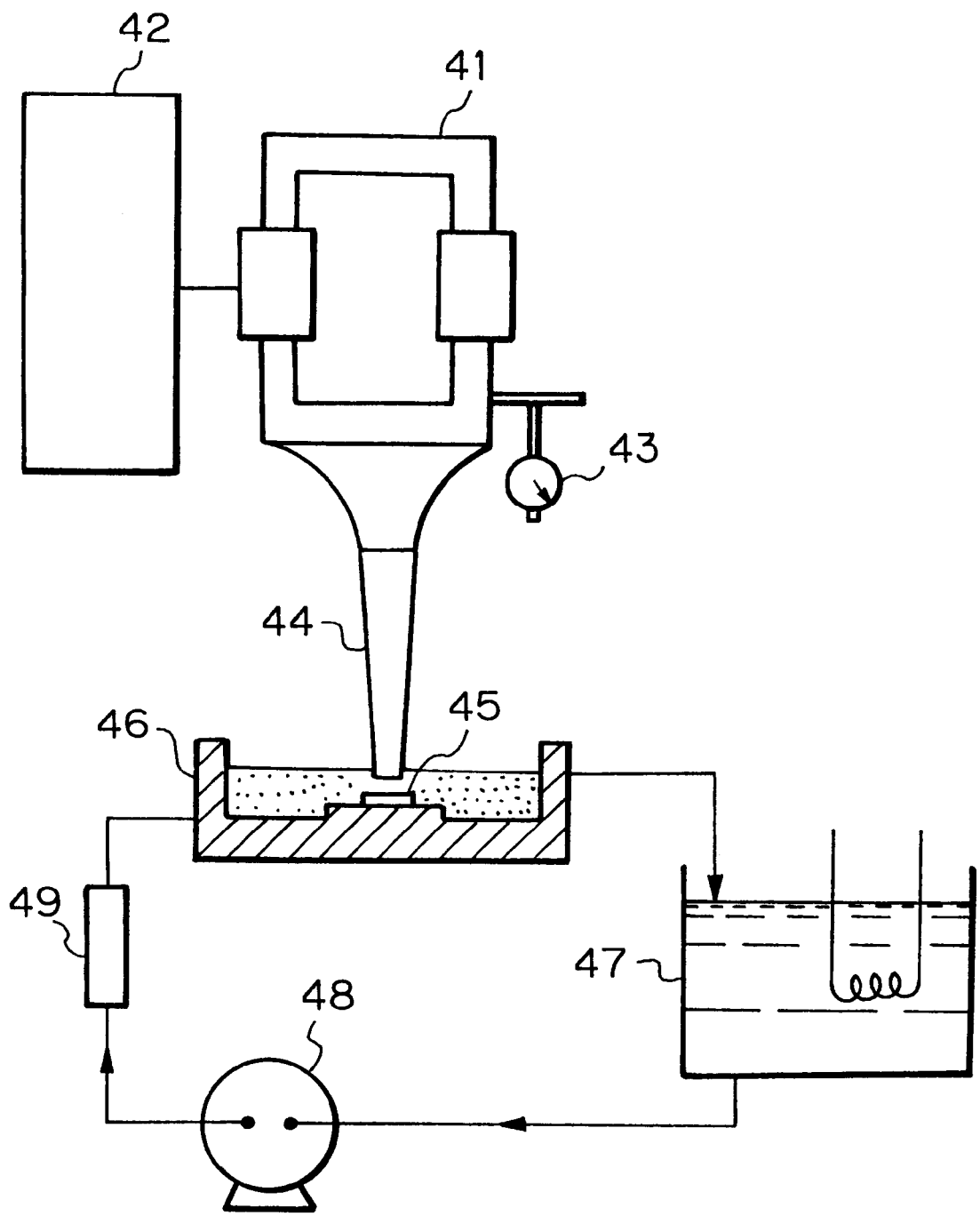
FIG. 4 schematically shows arrangement of a cavitation-erosion testing equipment.

The thin titanium nitride (TiN) film has excellent wear resistance as described above, and has excellent cavitation-erosion resistance as well. FIG. 3 shows cavitation-erosion test results conducted by cavitation-erosion testing equipment whose schematic arrangement is shown in FIG. 4. In FIG. 4, 41 represents a magnetostrictive vibrator, 42 a transmitter, 43 a dial gauge, 44 a horn, 45 a test piece, 46 a test piece mount, 47 a test liquid tank, 48 a circulating pump and 49 a flow meter. The test piece 45 is set on the test piece mount 46 in a position just below a tip of the horn 44 mounted on the magnetostrictive vibrator 41. The horn 44 is vibrated with the high-frequency. Then, cavitation air bubbles are produced at the tip of the horn 44. A shock wave due to collapsing of the cavitation air bubbles causes erosion of the surface of the test piece 45.

As shown in FIG. 3, 70 $\mu$m or more average damage depth was produced on a non-processed surface made of the SUS420J2 steel. On the other hand, only damage of about 1 $\mu$m depth was produced on a surface coated with the thin TiN film. In addition, damage of about 10 $\mu$m average damage depth was produced on a non-processed surface made of the SUS304 steel. On the other hand, only damage of about 1 $\mu$m depth was produced on a surface coated with the thin TiN film. In other words, it was found that coating the surface with the thin TiN film improved remarkably the cavitation-erosion resistance.

As a water lubricated bearing, a dynamic pressure journal bearing, a static pressure journal bearing, a dynamic pressure thrust bearing, a static pressure thrust bearing and the like are generally used. Any combination of the materials shown in Table 1 can be applied to a rotary member and a stationary member of these bearings. Moreover, in case of water lubricated seals, any combination of the materials shown in Table 1 can also be applied to a rotary member and a stationary member of the seals.

FIG. 5 shows one arrangement of the water lubricated dynamic pressure journal bearing. FIG. 5(a) is a partially sectioned front view, and FIG. 5(b) is a partially sectioned side view. In FIG. 5, 51 represents a carrier ring, 52 a pad stop, 53 a pad, 54 a joint pin, 55 a stop pin, 56 a joint bolt, 57 a rotating shaft, 58 a seal and 59 a seal retaining screw. When starting and stopping a machine, the rotating shaft 57 and the pads 53 contact each other. Once the rotating shaft 57 is rotated, a dynamic pressure by a lubricant (water) is produced between the rotating shaft 57 and the pads 53, and rotating shaft 57 is supported by the pads 53 without contact. A combination of the materials shown in Table 1 may be used for sliding surfaces of the pad 53 (stationary member) and the rotating shaft 57 (rotary member). It is quite reasonable that the materials of the rotary member of the combination shown in Table 1 may be applied to the stationary member, and vice versa. As described above, the rotating shaft 57 and the pads 53 contact each other when starting and stopping the machine. Therefore, the combination of the materials shown in Table 1 may produce satisfactory results in terms of wear resistance. During rotation of the rotating shaft 57, the combination of the materials may produce the satisfactory results in terms of the cavitation-erosion resistance.

Figure 6A:
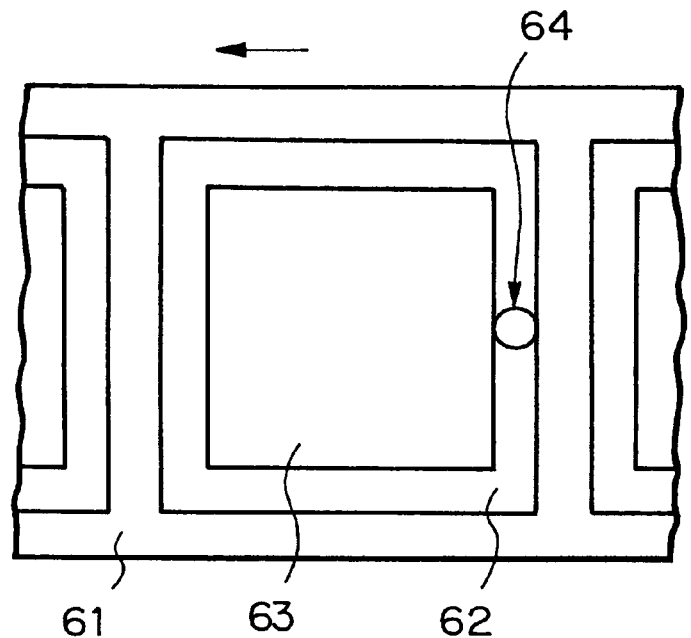
FIG. 6(a) is an unfolding view of a bearing surface.
Figure 6B:
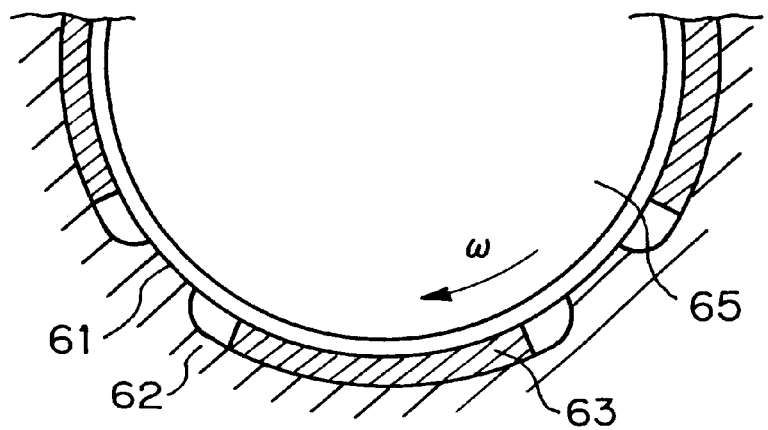
FIG. 6(b) is a front view of the bearing.

FIG. 6 shows one arrangement of the water lubricated static pressure journal bearing. FIG. 6(a) is an unfolding view of a bearing surface, and FIG. 6(b) is a front view of the bearing. In FIG. 6, 61 represents a land, 62 a pocket, 63 a pad received in the pocket, 64 a hole for providing the lubricant (water) and concurrently serving as a throttle and 65 a rotating shaft. The bearing has a load ability due to a static pressure action of the lubricant and a dynamic pressure action of the pads 63 and the land 61 caused by rotating the rotating shaft 65. A combination of the materials shown in Table 1 may be used for sliding surfaces of the land 61 and the pads 63 (stationary member) and the rotating shaft 65 (rotary member). It is quite reasonable that the materials of the rotary member of the combination shown in Table 1 may be applied to the stationary member, and vice versa. When starting and stopping a machine, the combination of the materials shown in Table 1 may produce satisfactory results in terms of wear resistance. Also, during rotation of the rotating shaft 65, the combination of the materials may produce satisfactory results in terms of the cavitation-erosion resistance.

Figure 7A:
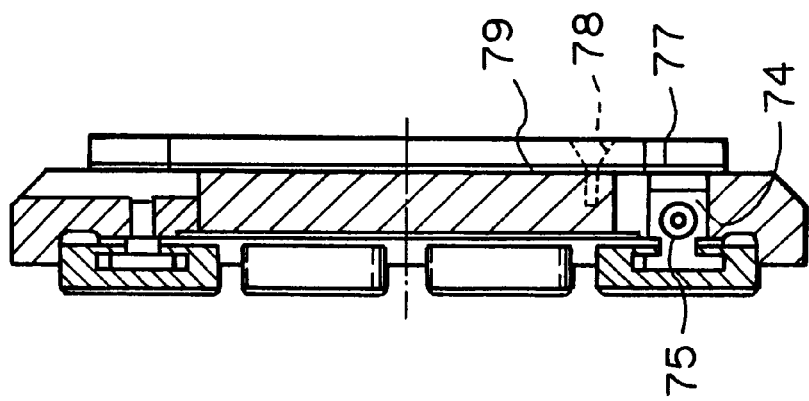
FIG. 7(a) is a plan view of the bearing and FIG. 7(b) is a cross-sectional view taken along line A—A of FIG. 7(a)
Figure 7B:
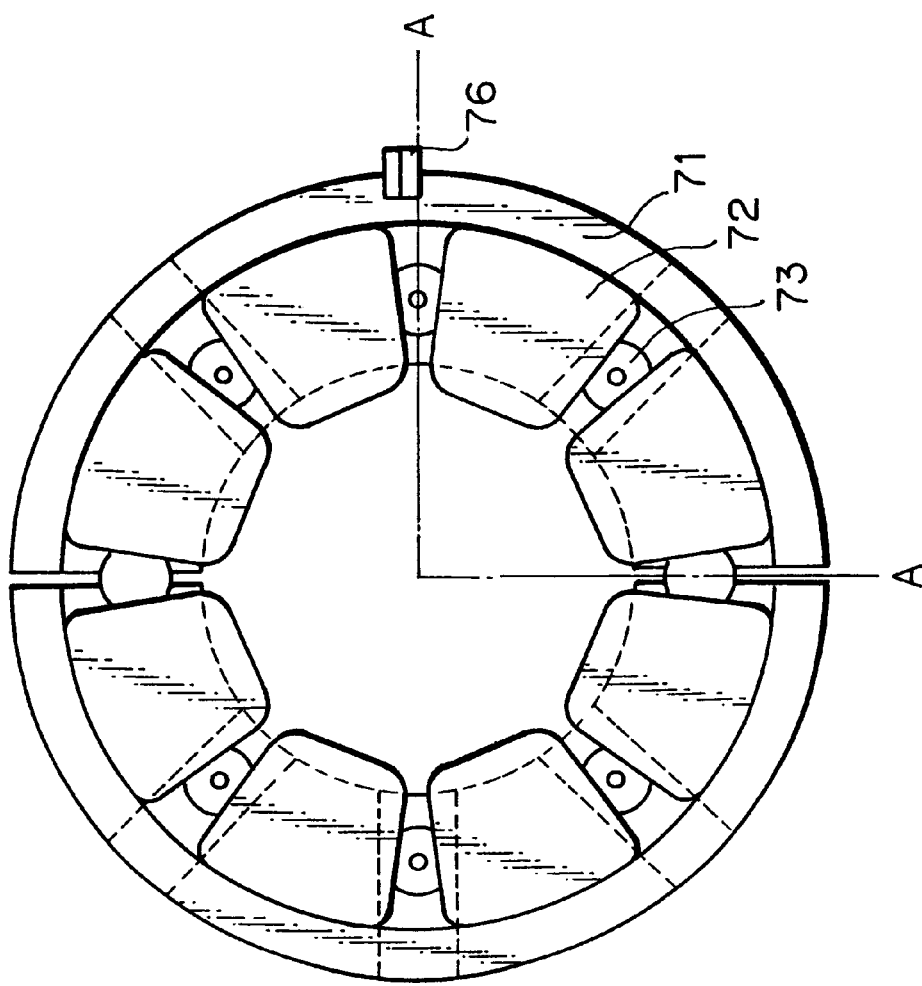

FIG. 7 shows one arrangement of the water lubricated dynamic pressure thrust bearing. FIG. 7(a) is a plan view and FIG. 7(b) is a cross-sectional view taken along the line A—A of FIG. 7(a). In FIG. 7, 71 represents a carrier ring, 72 a pad, 73 a pad stop, 74 an end pad stop, 75 an end pad stop retaining screw, 76 a stop key or pin, 77 an adjust spacer, 78 an adjust spacer retaining screw and 79 a shim. A rotary member (not shown) is rotated supportedly by a dynamic pressure produced between the rotary member and pad 72. A combination of the materials shown in Table 1 may be used for sliding surfaces of the rotary member and the pads 72 (stationary side member). It is quite reasonable that the materials of the rotary member of the combination shown in Table 1 may be applied to the stationary member, and vice versa. When starting and stopping a machine, the combination of the materials shown in Table 1 may produce satisfactory results in terms of wear resistance. Also during rotation of the rotating shaft 75, the combination of the materials may produce satisfactory results in terms of the cavitation-erosion resistance.

Figure 8B:
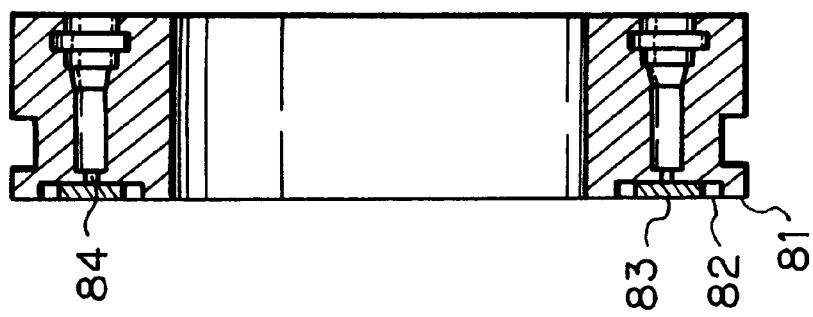
FIG. 8(a) is a plan view of the bearing and FIG. 8(b) is a cross-sectional view taken along line B—B of FIG. 8(a)
Figure 8A:
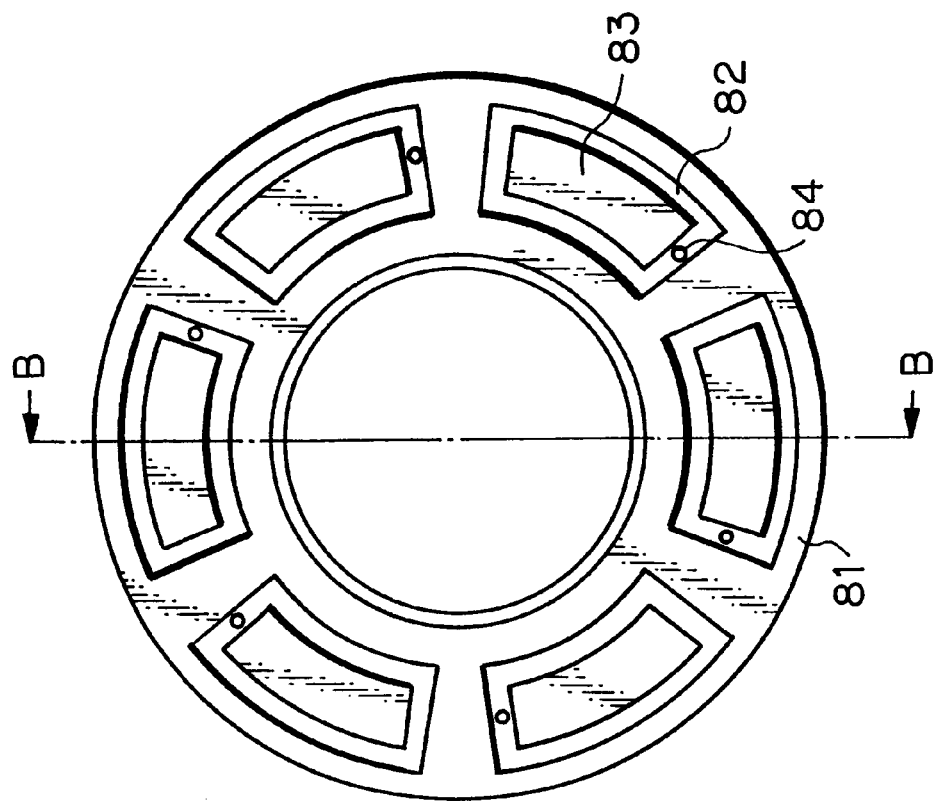

FIG. 8 shows one arrangement of the water lubricated static pressure thrust bearing. FIG. 8(*a*) is a plan view, and FIG. 8(*b*) is a cross-sectional view taken along line B—B of FIG. 8(*a*). In FIG. 8, 81 represents a land, 82 a pocket, 83 a pad received in the pocket and 84 a hole for providing the lubricant (water) and concurrently serving as a throttle. The land 81 is at the same level with the pads 83. A rotary member (not shown) is rotated supportedly by a static pressure and a dynamic pressure produced between the rotary member and a bearing surface. A combination of the materials shown in Table 1 may be used for sliding surfaces of the rotary member and the pads 83 and the land 81 (stationary member). It is quite reasonable that the materials of the rotary member of the combination shown in Table 1 may be applied to the stationary member, and vice versa. When starting and stopping a machine, the combination of the materials shown in Table 1 may produce satisfactory results in terms of wear resistance. Also, during rotation of the rotating side member, the combination of the materials may produce satisfactory results in terms of the cavitation-erosion resistance.

Figure 9:
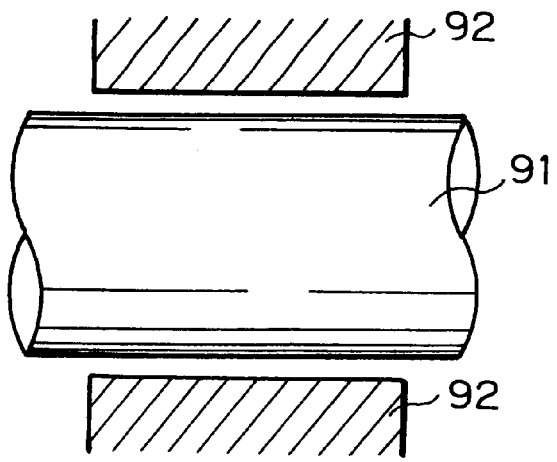
FIG. 9 is a cross-sectional view showing one arrangement of a water lubricated seal.

FIG. 9 shows one arrangement of a flat type water lubricated annular clearance seal. In FIG. 9, 91 represents a rotating shaft and 92 represents a liner ring. A narrow clearance formed between an outer surface of the rotating shaft 91 and an inner surface of the liner ring 92 reduces a leak from a high pressure side to a low pressure side. A combination of the materials shown in Table 1 may be used for sliding surfaces of the rotating shaft 91 (rotary member) and the liner ring 92 (stationary member). It is quite reasonable that the materials of the rotary member of the combination shown in Table 1 may be applied to the stationary member, and vice versa. When starting and stopping a machine, the combination of the materials shown in Table 1 may produce satisfactory results in terms of wear resistance. Also, during rotation of the rotating member, the combination of the materials may produce satisfactory results in terms of the cavitation-erosion resistance.

Figure 10:
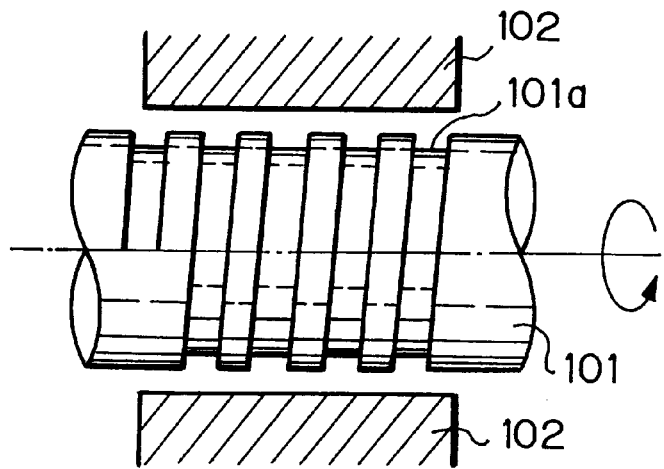
FIG. 10 is a cross-sectional view showing one arrangement of a screw type water lubricated seal.
Figure 11:
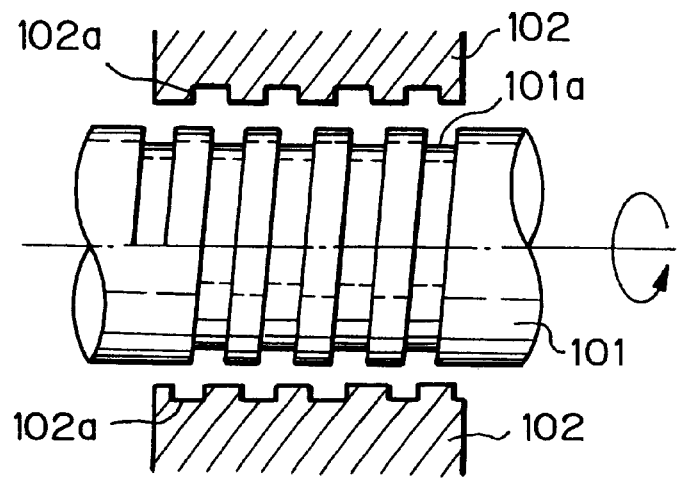
FIG. 11 is a cross-sectional view showing one arrangement of a double screw type water lubricated seal.

FIG. 10 shows one arrangement of a typical screw type water lubricated seal and FIG. 11 shows one arrangement of a known double screw type water lubricated seal. In FIGS. 10 and 11, 101 represents a rotating shaft and 102 represents a liner ring. In FIG. 10, a threaded groove 101*a* is formed on an outer periphery of the rotating shaft 101. In FIG. 11, threaded grooves 101*a* and 102*a,* which are in an opposite direction each other (left-hand threaded groove 101*a,* right-hand threaded groove 102*a*), are formed on the outer periphery of the rotating shaft 101 and an inner periphery of the liner ring 102. By rotating the rotating shaft 101, sealing action is effected due to a pumping action of the threaded groove formed on the rotating shaft 101 (FIG. 10) or threaded grooves formed on the rotating shaft 101 and on the liner ring 102 (FIG. 11), producing a flow from a low pressure side to a high pressure side. A combination of the materials shown in Table 1 may be used for sliding surfaces of the rotating shaft 101 (rotary member) and the liner ring 102 (stationary member). It is quite reasonable that the materials of the rotary member of the combination shown in Table 1 may be applied to the stationary member and vice versa. When starting and stopping a machine, the combination of the materials shown in Table 1 may produce satisfactory results in terms of wear resistance. During rotation of the rotating member, the combination of the materials may produce satisfactory results regarding the cavitation-erosion resistance.

Substrate materials of the rotary member or the stationary member for forming the thin TiN film thereon for constituting the water lubricated bearing or water lubricated seal are not limited to those shown in Table 1, and may be other metallic materials. Further, substrate materials for forming the thin DLC film, the thin CrN film and the like thereon are also not limited to those shown in Table 1, and may be other metallic materials. Film thicknesses of TiN, CrN, DLC and the like are not limited to those shown in Table 1.

FIGS. 5 to 11 show some examples of arrangements of the dynamic pressure journal bearing, the static pressure journal bearing, the dynamic pressure thrust bearing, the static pressure thrust bearing and the seals. The water lubricated bearing or water lubricated seal of the present invention is not limited to these arrangements.

As has been described above, the present invention provides the following advantageous effect. The TiN film is formed on at least one sliding surface either one of the rotary member or the stationary member constituting the water lubricated bearing or water lubricated seal, and the nitride ceramic film, the oxide ceramic film, the carbide ceramic film, the hard chromium plating, or the zirconium boride film is formed on the other sliding surface. Instead, a martensitic stainless steel, a hard carbon, PEEK including a carbon fiber, or the PTFE including a carbon fiber is formed on the other sliding surface. Thereby, the water lubricated bearing or water lubricated seal having a low coefficient of friction, and excellent water resistance and cavitation-erosion resistance can be provided.

What is claimed is:

1. A water lubricated machine component having contacting sliding surfaces, comprising:

a rotary member having a siding surface with a reduced coefficient of friction in the presence of water, and a stationary member having a sliding surface, with a reduced coefficient of friction in the presence of water, facing said rotary member for making sliding contact therewith, wherein said sliding surfaces of said rotary member and said stationary member are disposed so as to be lubricated by said water, and wherein a substrate of either one of said rotary member and said stationary member is a metallic material and a titanium nitride film is formed, by a dynamic ion mixing method on said sliding surface thereof, and wherein the other member is a metallic material having a film of hard material formed thereon comprising a hard chromium plating.

2. A water lubricated machine component, having contacting sliding surfaces, comprising:

a rotary member having a sliding surface with a reduced coefficient of friction in the presence of water, and a stationary member having a sliding surface, with a reduced coefficient of friction in the presence of water, facing, said rotary member for making sliding contact therewith, wherein said sliding surfaces of said rotary member and said stationary member are disposed so as to be lubricated by said water, and wherein a substrate of either one of said rotary member and said stationary member is a metallic material and a titanium nitride film is formed, by a dynamic ion mixing method, on said sliding surface thereof, and wherein the other member is made of a non-brittle material having a sliding surface of a martensitic stainless steel.

3. A water lubricated machine component having contacting sliding surfaces, comprising:

a rotary member having a sliding surface with a reduced coefficient of friction in the presence of water, and a stationary member having a sliding surface with a reduced coefficient of friction in the presence of water facing said rotary member for making sliding contact therewith, wherein said sliding surfaces of said rotary member and said stationary member are disposed so as to be lubricated by said water, and wherein a substrate of either one of said rotary member and said stationary member is a metallic material and a titanium nitride film is formed, by a dynamic ion mixing method, on said sliding surface thereof;

wherein the other member is made of a non-brittle material; and wherein at least the sliding surface of said other member is made of a polyether ether ketone including one of a carbon fiber and a polytetrafluoroethylene resin including a carbon fiber.

4. A water lubricated machine component claimed in any of claims 1, 2, or 3 wherein said component is a water lubricated bearing.

5. A water lubricated machine component claimed in any of claims 1, 2, or 3 wherein said component is a water lubricated seal.

6. A water lubricated machine component claimed in any of claims 1, 2, or 3 wherein said rotary member is secured directly to a rotary side of said machine component.

7. A water lubricated machine component claimed in any of claims 1, 2, or 3 wherein said rotary member is indirectly secured to a rotary side of said machine component.

8. A water lubricated machine component claimed in any of claims 1, 2, or 3 wherein said stationary member is secured directly to a stationary side of said machine component.

9. A water lubricated machine component claimed in any of claims 1, 2, or 3 wherein said stationary member is indirectly secured to a stationary side of said machine component.

* * * * *